(12) United States Patent
Warner (10) Patent No.: US 9,482,686 B2
(45) Date of Patent: Nov. 1, 2016

(54) AIRCRAFT WHEEL SPEED SENSOR

(71) Applicant: Woodward, Inc., Fort Collins, CO (US)

(72) Inventor: Stephen B. Warner, Evanston, IL (US)

(73) Assignee: Woodward, Inc., Fort Collins, CO (US)

( * ) Notice: Subject to any disclaimer, the term of this patent is extended or adjusted under 35 U.S.C. 154(b) by 178 days.

(21) Appl. No.: 13/799,637

(22) Filed: Mar. 13, 2013

(65) Prior Publication Data

US 2014/0266156 A1 Sep. 18, 2014

(51) Int. Cl.
*G01P 3/42* (2006.01)
*G01P 3/48* (2006.01)
*G01P 3/54* (2006.01)
*G01B 7/14* (2006.01)
*G01P 3/46* (2006.01)
*G01P 3/481* (2006.01)
*G01P 3/488* (2006.01)

(52) U.S. Cl.
CPC .............. *G01P 3/465* (2013.01); *G01P 3/481* (2013.01); *G01P 3/488* (2013.01)

(58) Field of Classification Search
CPC ........... G01P 3/48; G01P 3/54; G01P 3/465; G01P 15/00; G01P 3/42; G01B 7/14
USPC ........... 324/161, 163, 166–167, 173, 207.25, 324/503, 160, 174; 310/114, 168, 77; 303/114, 168; 701/41, 70, 71, 22
See application file for complete search history.

(56) References Cited

U.S. PATENT DOCUMENTS

| | | |
|---|---|---|
| 3,920,284 A * | 11/1975 | Lane et al. ............... 303/122.06 |
| 4,001,687 A | 1/1977 | Sorkin et al. |
| 4,027,753 A | 6/1977 | Lantz |
| 4,458,168 A | 7/1984 | Welburn |
| 5,019,774 A * | 5/1991 | Rosenberg .................... 324/174 |
| 5,032,790 A | 7/1991 | Johnson |
| 5,124,625 A | 6/1992 | Wakabayashi |
| 5,418,453 A | 5/1995 | Wise |
| 5,471,361 A | 11/1995 | Wootton |
| 5,903,205 A | 5/1999 | Goto et al. |

(Continued)

FOREIGN PATENT DOCUMENTS

GB 2014319 8/1979

OTHER PUBLICATIONS

Invitation to Pay Additional Fees and Partial International Search Report issued in International Application No. PCT/US2014/021811 on Jun. 3, 2014; 7 pages.

(Continued)

*Primary Examiner* — Tung X Nguyen
*Assistant Examiner* — Neel Shah
(74) *Attorney, Agent, or Firm* — Fish & Richardson P.C.

(57) ABSTRACT

In some aspects of what is described herein, an aircraft wheel speed sensor system includes a pair of conductors coupled between an electro-mechanical system and a control system. The control system is configured to apply a carrier voltage signal to the pair of conductors and to detect a modulated current signal on the pair of conductors. The electro-mechanical system includes a stator and a rotor that moves upon rotation of an aircraft wheel. The stator includes a winding disposed about the rotor. The winding is configured to produce the modulated current signal on the pair of conductors in response to movement of the rotor. The modulated current signal has a frequency that is dependent on a rotational speed of the aircraft wheel.

21 Claims, 4 Drawing Sheets

(56) References Cited

U.S. PATENT DOCUMENTS

| | | | |
|---|---|---|---|
| 5,986,448 A | 11/1999 | Yada et al. | |
| 7,578,185 B2* | 8/2009 | Ether et al. | 73/488 |
| 7,723,942 B1 | 5/2010 | Labriola, II | |
| 2003/0230947 A1* | 12/2003 | Islam et al. | 310/156.47 |
| 2006/0226698 A1* | 10/2006 | Riebe et al. | 303/20 |
| 2006/0250124 A1* | 11/2006 | Ether | G01P 3/42 |
| | | | 324/160 |
| 2010/0060222 A1* | 3/2010 | Kezobo | G01R 31/42 |
| | | | 318/490 |
| 2011/0018526 A1* | 1/2011 | Windmueller et al. | 324/176 |
| 2011/0227523 A1 | 9/2011 | Grantz | |

OTHER PUBLICATIONS

International Search Report and Written Opinion of the International Searching Authority issued in International Application No. PCT/US2014/021811 on Aug. 18, 2014; 20 pages.

"Bodet Aero AC Tachometers Socitec ST Series," [online] [retrieved on Mar. 6, 2013] Retrieved from the Internet: URL:http://www.circoraerospace.com/downloads/bodet/Bodet-AC-Tachometers-ST-Series.pdf, 2 pages.

"Antiskid Brake Control Tutorial—Crane Aerospace & Electronics," [online] [retrieved on Mar. 6, 2013] Retrieved from the Internet: URL:http://www.craneae.com/Products/Landing/Antiskid.aspx, 1 page.

"Hypernetics Wheel Tachometers," [online] [retrieved on Mar. 6, 2013] Retrieved from the Internet: URL:http://www.hyperneticsltd.com/tachometers.html, 1 page.

Speed Transducers Tachometers ST Series CIRCOR Aerospace, Inc. [online] [retrieved on Mar. 6, 2013] Retrieved from the Internet: URL:http://www.circoaerospace.com/products-tachometers-encoders.asp, copyright 2007-2009, 1 page.

PCT International Preliminary Report on Patentability, PCT/US2014/021811, Sep. 24, 2015, 14 pages.

\* cited by examiner

FIG. 3B
1800 RPM

FIG. 3A
900 RPM

FIG. 4

AIRCRAFT WHEEL SPEED SENSOR

BACKGROUND

This specification relates to sensing aircraft wheel speed. Many types of aircraft use speed sensors to sense the speed of the aircraft's wheels. For example, wheel speed sensors are used in aircraft anti-skid control systems—also known as anti-lock braking systems. Wheel speed sensors typically detect the time varying position or speed of the aircraft wheel and produce an analog or digital output signal that indicates the detected information.

SUMMARY

In one general aspect, a signal modulated by rotor movement depends on the rotational speed of an aircraft wheel.

In some aspects, a carrier voltage signal is applied to a pair of conductors connected to a stator winding. The stator winding is disposed about a rotor that moves upon rotation of an aircraft wheel. The stator winding is configured to render a modulated current signal on the pair of conductors in response movement of the rotor. The modulated current signal has a frequency that is dependent upon the rotational speed of the aircraft wheel.

Implementations may include one or more of the following features. The modulated current signal is detected. The modulated current signal is isolated from its carrier signal. The carrier excitation voltage signal is a fixed-frequency voltage signal. The modulated current signal is a variable-frequency-modulation to the carrier voltage signal. The carrier signal has a frequency that is many times greater (e.g., ten or more times) an expected frequency of the modulated current signal.

Additionally or alternatively, these and other implementations may include one or more of the following features. A fixed-voltage square wave logic frequency signal having the frequency of the modulated current signal is generated. The square wave logic signal is provided to an aircraft control system. A speed of the aircraft wheel is determined based on the detected modulated current signal frequency. A range of aircraft wheel speeds is detected, including down to nearly zero velocity.

In some aspects, an aircraft wheel speed sensor system includes a pair of conductors coupled between an electro-mechanical system and a control system. The control system is configured to apply a carrier voltage excitation signal to the pair of conductors and to detect a modulated current signal on the same pair of conductors. The electro-mechanical system includes a stator and a rotor that moves upon rotation of an aircraft wheel. The stator includes a winding disposed about the rotor. The winding is configured to render the modulated current signal on the pair of conductors in response to movement of the rotor. The modulated current signal has a frequency that is dependent on a rotational speed of the aircraft wheel.

Implementations may include one or more of the following features. The stator includes major stator teeth, and the winding includes coils wound in series about the major stator teeth in alternating polarity about the circumference of the stator. The stator includes minor stator teeth extending toward the rotor from the major stator teeth. The rotor includes rotor teeth extending toward the minor stator teeth. The stator includes minor stator slots between adjacent pairs of the minor stator teeth, and each minor stator tooth is narrower than its two neighboring minor stator slots. The rotor includes rotor slots between adjacent pairs of the rotor teeth, and each rotor tooth is narrower than its two neighboring rotor slots. Magnetic interactions between the minor stator teeth and the rotor teeth produce the modulated current signal on the winding by the effect of position variable inductance. The rotor includes a shaft that is mechanically coupled to the aircraft wheel. The electro-mechanical system does not include or rely on permanent magnets, nor does it function as an alternator or generator.

In certain contexts, some aspects of what is described herein may provide one or more advantages. The speed sensor systems and speed sensing techniques described herein can provide a robust speed signal. For example, the systems described herein can detect lower wheel speeds than some conventional systems based on wound field or permanent magnet alternators. In some cases, the techniques described herein can be implemented in smaller or lighter-weight hardware, for example, without permanent magnets, and with fewer wires, fewer leads, less electrical hardware, etc.

The techniques and systems described herein can be used in aircraft systems and in other types of systems where rotational speed is detected. For example, the speed sensor systems and speed sensing techniques can be used to detect the speed of an aircraft wheel, an automotive wheel, a turbine rotor, an electric motor, or other machines.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

In some aspects of what is described herein, a wheel speed sensor system includes an electro-mechanical system and a controller that are connected by only two wires. Using a two-wire architecture, the electro-mechanical system can be excited with a steady state alternating (AC) voltage, and the electro-mechanical system can produce a modulated AC current of constant amplitude on the same two wires that it is excited with. The modulated AC current can be converted to a logical output pulse train. Because the modulated current signal has a relatively constant working amplitude over a full range of operating velocities, even very low velocity rotation produces a signal amplitude that can be processed (e.g., above a noise threshold). In some prior systems that use permanent magnets, the signal amplitude decreases to a uselessly low value as the velocity reduces.

In some examples of what is described herein, a wheel speed sensor system includes an electro-mechanical subsystem having high-frequency ferromagnetic cores (rotor and stator cores). A pair of bearings allow the rotor to rotate relative to the stator. A high minor tooth count can be employed on the cores to yield a high frequency output signal. The minor teeth can be asymmetrical compared to their neighboring notches to enhance the inductance change from minimum to maximum. The major stator teeth can be wound with a series of copper magnet wire coils. In some examples, no permanent magnets are required. The output signal produced by the electro-mechanical system can have a peak amplitude that is constant (e.g., without substantial variation) and valid to nearly zero rotational velocity. In some cases, the sensor system can be implemented by a construction that is extremely robust and suitable for harsh environments.

Figure 1:
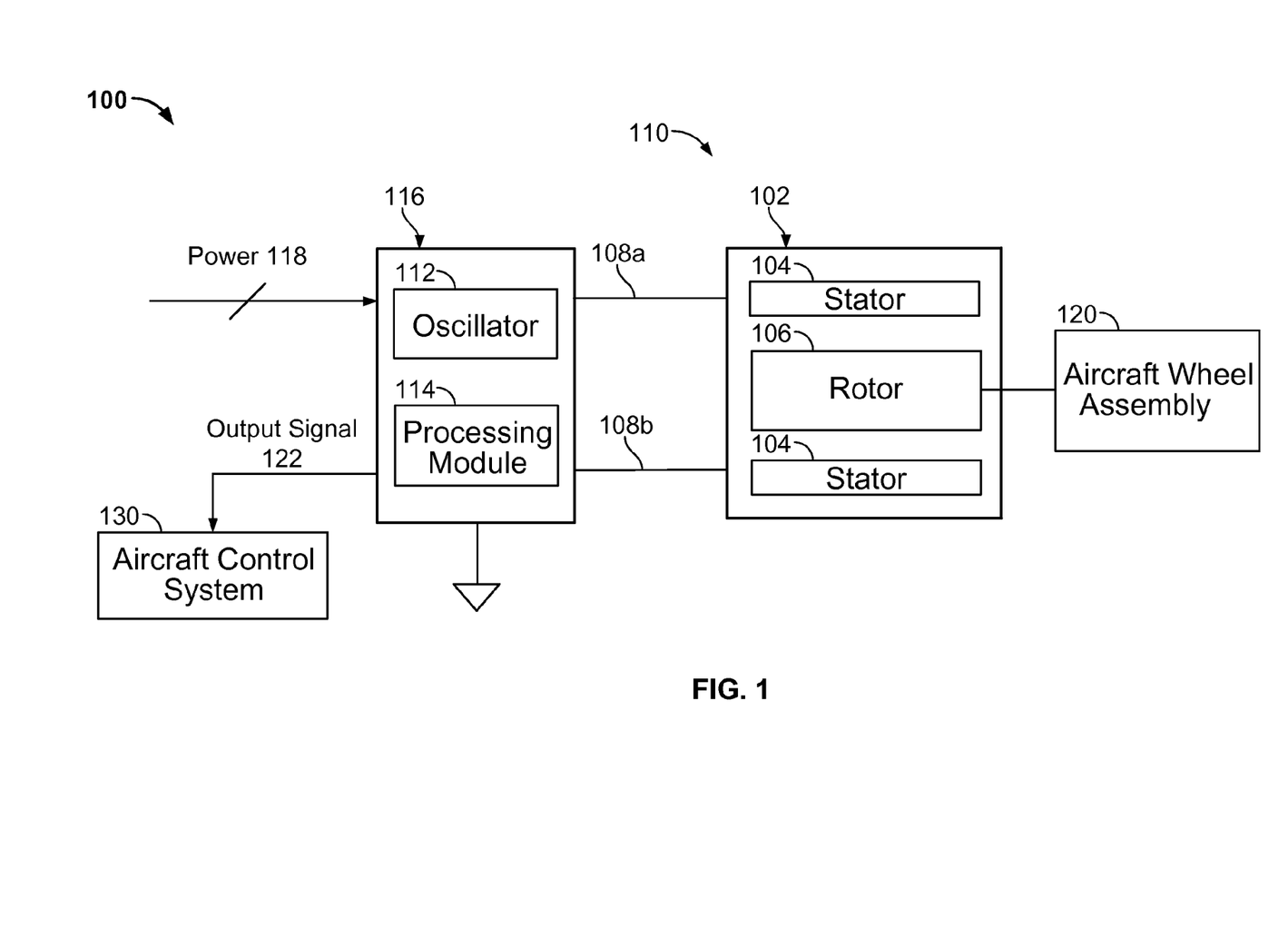
FIG. 1 is a schematic diagram of an example wheel speed detection system.

FIG. 1 is a schematic diagram of an example wheel speed detection system 100. The example wheel speed detection system 100 is shown in FIG. 1 in the context of an aircraft system for detecting the rotational speed of an aircraft wheel. The wheel speed detection system 100 can be adapted for other applications, for example, to detect the speed of other types of rotators (e.g., wheels, rotors, gears, etc.). The example wheel speed detection system 100 includes a sensor system 110, an aircraft wheel assembly 120, and an aircraft control system 130. A wheel speed detection system can included additional or different features, and the features of a wheel speed detection system can be configured as shown in FIG. 1 or in another configuration.

The example sensor system 110 includes a controller 116 and a machine 102. The machine 102 is mechanically coupled (e.g., by a shaft, a gear assembly, or a combination of these and other types of mechanical links) to the aircraft wheel assembly 120. The controller 116 is communicably coupled (e.g., by a wired connection, a wireless connection, or a combination of these and other types of communication links) to the aircraft control system 130. The machine 102 is electrically connected to the controller 116 by a pair of conductors 108a, 108b. A sensor system can include additional or different components, arranged as shown or in another arrangement.

The example machine 102 includes a stator 104 and a rotor 106. A machine can include additional or different components. The stator 104 carries a stator winding that is connected to the conductors 108a, 108b. The rotor 106 is coupled to the stator 104 by a magnetic (inductive) interaction. The example machine 102 can convert mechanical movement of the rotor 106 on an electrical signal on the conductors 108a, 108b. In some examples, the machine 102 can be the electric machine 200 shown in FIG. 2, or another type of machine can be used.

The example controller 116 includes an oscillator 112 and a processing module 114. A controller can include additional or different components. The oscillator 112 can receive power 118 (e.g., from a variable power supply, from a voltage bus, etc.) and generate a carrier voltage signal. The carrier voltage signal can be a single-frequency alternating voltage signal (e.g., 1 kHz, 30 kHz, 50 kHz, 100 kHz, etc.). The controller 116 can apply the carrier voltage signal to the conductors 108a, 108b, which transfer the carrier voltage signal to the winding of the stator 104. In some instances, movement of the rotor 106 modulates the current in the stator winding, and through the conductors 108a, 108b. The processing module 114 can detect the modulated signal (e.g., current, voltage, etc.) on the conductors 108a, 108b, and produce an output signal 122 based on the detected current modulation.

In some cases, the output signal 122 is a logical (e.g., binary) square wave signal that has the frequency of the modulated current signal detected on the conductors 108a, 108b. For example, if the modulation has a frequency of 1 kHz, the output signal 122 can be a square wave having a frequency of 1 kHz. In the example shown, the frequency of the modulated current signal depends on the rotational velocity of the rotor 106, which in turn, depends on the rotational velocity of the aircraft wheel. Thus, the example output signal 122 in FIG. 1 has a frequency that is related to (e.g., directly proportional to) the rotational speed of the aircraft wheel, and the aircraft control system 130 can determine the aircraft wheel speed from the output signal 122.

In some aspects of operation, the controller 116 applies a carrier voltage signal to the stator winding via the conductors 108a, 108b. Rotation of the aircraft wheel in the aircraft wheel assembly 120 causes the rotor 106 to move with respect to the stator 104. Movement of the rotor 106 modulates the current signal in the conductors 108a, 108b via the stator winding. The frequency of the modulated current signal is related to (e.g., proportional to, equal to, or otherwise related to) the rotational speed of the aircraft wheel. The controller 116 detects the modulated current signal. For example, the processing module 114 can use precision rectification, low pass filtering, AC coupling and other standard processing techniques to isolate the velocity-dependent signal from the carrier signal. The modulated current signal can be detected in another manner. The controller 116 can produce the output signal 122 based on the detected modulation. For example, the controller 116 may process the signal by a ground-referenced comparator, and produce a logic level variable-frequency square wave signal for use by the downstream aircraft control system 130.

The example aircraft wheel assembly 120 includes one or more aircraft wheels and possibly other components. The aircraft wheel assembly can be part of the aircraft landing gear, or another aircraft subsystem. One or more wheels of the aircraft wheel assembly 120 is mechanically coupled to the rotor 106 of the machine 102. For example, a wheel axle in the aircraft wheel assembly 120 can be mechanically coupled to a shaft of the rotor 106, with possibly additional mechanical components intermediate the wheel and the rotor. The speed ratio or mechanical advantage between the wheel and the rotor 106 can be 1:1, or a different (higher or lower) speed ratio can be used.

The example aircraft control system 130 includes one or more digital electronic controls (e.g., digital controllers, digital processors, microprocessors, computer systems, etc.) that receive the output signal 122. The aircraft control system 130 may convert the output signal 122 to a speed or frequency value (e.g., rotations per unit time, etc.), and the value can be stored, displayed, processed, or used as input in a control system algorithm or logic. In some cases, an aircraft anti-skid control system (anti-lock braking system) can operate based on the output signal 122.

Figure 2:
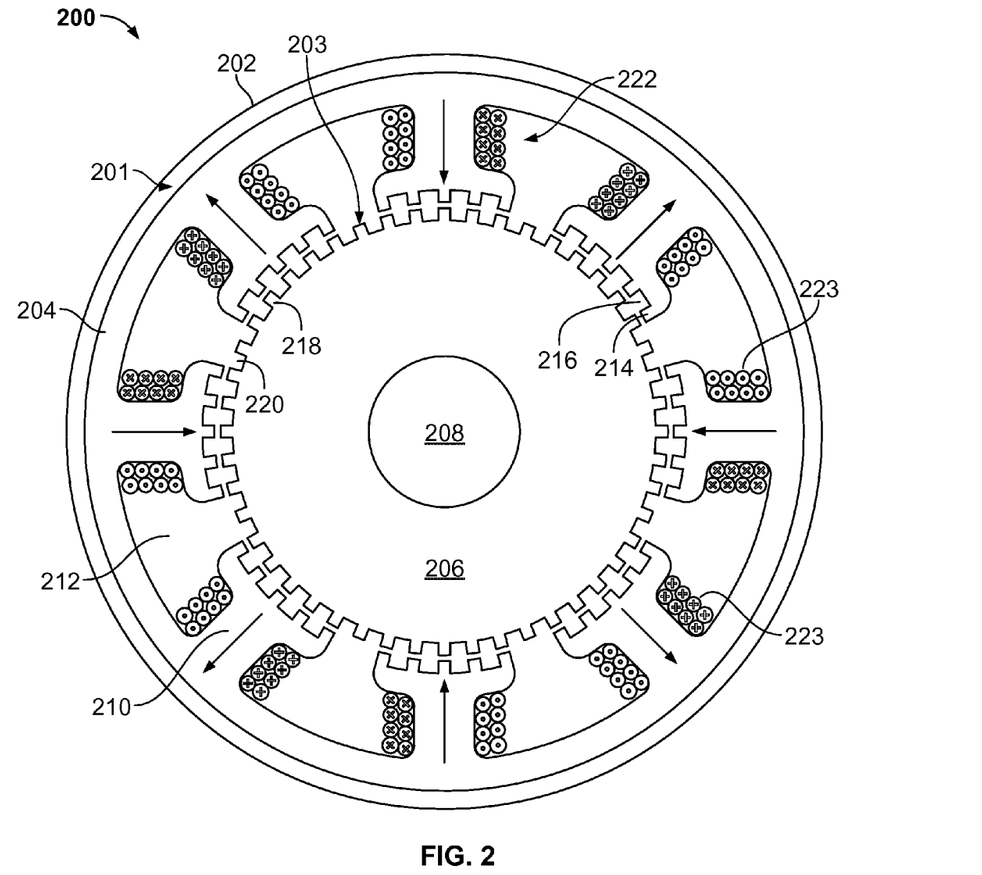
FIG. 2 is a cross-sectional side view of an example electric machine system.

FIG. 2 is a cross-sectional side view of an example electric machine 200. The example electric machine 200 can be used in a sensor system, such as, for example, the example sensor system 110 shown in FIG. 1. The example electric machine 200 can be used in other types of systems. For example, example electric machine 200 can be used to detect the speed or position of an aircraft wheel, an automotive wheel, a turbine rotor, an electric motor, or other rotating members. As shown in FIG. 2, the example electric machine 200 includes a housing 202, a stator 201, and a rotor 203. An electric machine can include additional or different components, and the components of an electric machine can be arranged as in the example electric machine 200 or in another arrangement.

The example stator 201 shown in FIG. 2 includes a stator core 204 and a stator winding 222 installed in the stator core 204. The stator core 204 can be made of high frequency ferromagnetic material (e.g., electrical steel, powdered iron, ferrite, etc.) or another type of material. The winding 222 can be made of copper or another type of conducing material. The example stator core 204 includes major stator teeth 210 and major stator slots 212 between each adjacent pair of major stator teeth 210. As shown in the example in FIG. 2, the major stator teeth 210 each include minor stator teeth 214 extending toward the rotor and minor stator slots 216 between each adjacent pair of minor stator teeth 214. The stator winding 222 includes multiple magnet wire coils 223. The coils 223 are wound on the major stator teeth 210 in alternating senses of direction (N, S, N, S, etc.) all the way around the circumference of the stator core 204. A stator can include additional or different features that can be configured as shown or in another configuration.

In the example shown in FIG. 2, the example stator 201 has a generally cylindrical geometry. The stator core 204 can include laminations that are stacked in the axial direction. Each lamination can be a substantially planar structure that has the generally radial geometry shown in FIG. 2. The major stator teeth 210 extend radially inward from the outer circumference of the stator core 204. The minor stator teeth 214 extend radially inward from the major stator teeth 210 toward the rotor 203. The major stator teeth 210 include a narrow section near the outer circumference of the stator core 204 and a broad section toward the inner circumference. The major stator slots 212 defined by the major stator teeth 210 include grooves that carry the winding 222.

Each coil 223 of the example winding 222 defines multiple conducting loops about the narrow section of one of the major stator teeth 210, and the individual coils 223 are connected to each other in series. Because all of the coils 223 are connected in series, the winding 222 defines a single conducting path through the stator core 204. The conducting path defined by the winding 222 extends between a first end of the winding 222 and a second end of the winding 222. Between the two ends of the winding 222, the conducting path encircles each major stator tooth eight times (through the coils 223) in series. The first and second ends of the winding can be connected to external leads (or conductors) external to the electric machine 200. For example, the two ends of the winding 222 can be connected to the conductors 108a, 108b in the example shown in FIG. 1. As such, the winding 222 can form a single conducting path through the stator 201 between external leads.

The example winding 222 can be driven by an external voltage source. In some instances, an external control system (e.g., an oscillator, a power source, the controller 116 shown in FIG. 1 or another type of control system) applies a time-varying voltage signal to the two opposite ends of the winding. The carrier voltage signal can be a single-frequency sine-wave signal or another type of voltage signal. In some cases, the carrier voltage signal produces a time-varying magnetic field in the stator core 204.

In the example shown in FIG. 2, the cross-section of each coil 223 is labeled with an "x" or an "o" in FIG. 2 to show the direction of current through the coil 223 at a given instant in time. The winding 222 can produce local magnetic fields in each major stator tooth 210. The arrows in FIG. 2 show the direction of the magnetic field in each major stator tooth 210 at a given instant in time. The local magnetic field in each major stator tooth 210 has the opposite orientation of the local magnetic field in each of the two neighboring major stator teeth 210. In the example shown, the coils 223 and the eight major stator teeth 210 define a four-pole magnetic field.

The example rotor 203 shown in FIG. 2 includes a shaft 208 and a rotor core 206. The rotor core 206 can be made of high frequency ferromagnetic material (e.g., electrical steel, powdered iron, ferrite, etc.) or another type of material. The shaft 208 can be made of aluminum, steel, or another type of material. As shown in FIG. 2, the rotor core 206 includes rotor teeth 218 that extend radially outward at an outer circumference of the rotor core 206. The rotor core 206 includes rotor slots 220 between each adjacent pair of the rotor teeth 218. In the example shown in FIG. 2, the rotor teeth 218 and the minor stator teeth 214 have similar or identical width. A stator can include additional or different features that can be configured as shown or in another configuration.

The example rotor 203 shown in FIG. 2 can be configured to move in response to rotation of external system (e.g., a wheel or another type of rotatable component). For example, the rotor 203 can be configured to rotate at a rotational speed that is determined by the rotational speed of the external system. The shaft 208 mechanically couples the rotor 203 with the external system. The shaft 208 is supported on each of its axial ends by bearings. The bearings reside outside the stator core 204 and allow the shaft 208 to rotate within the stator core 204 in response to movement (e.g. rotation) of the external system. The rotor core 206 is secured to and rotates with the shaft 208.

The angular position of the example rotor 203 varies between the aligned condition (where the rotor teeth 218 are aligned with the minor stator teeth 214) and the misaligned condition (where the rotor teeth 218 are misaligned with the minor stator teeth 214). Between the aligned and misaligned conditions, the rotor teeth 218 and the minor stator teeth 214 are aligned (or misaligned) to a degree. In the example shown in FIG. 2, the rotor teeth 218 are configured to magnetically interact with the minor stator teeth 214. In particular, the degree of alignment or misalignment of the rotor teeth 218 and the minor stator teeth 214 can vary the mutual inductance between the rotor 203 and the stator 201.

In some instances, the example electric machine 200 can operate as a fine-pitch variable inductor of minimized leakage inductance with a distinctly varying inductance value (between the aligned to misaligned conditions) as a function of rotation. The distinction between the aligned and misaligned positions can be enhanced, for example, by using an asymmetrical tooth plan in which the minor stator teeth 214 are narrower in width than the minor stator slots 216 on either side of them. In some cases, the minor stator teeth 214 are significantly narrower in width than the minor stator slots 216.

In some instances, the rotational speed of the example rotor 203 determines the frequency of the magnetic field variations in the stator core 204. The example rotor 203 includes forty-eight (48) rotor teeth, and one rotation of the rotor 203 within the stator 201 produces forty-eight cycles of the magnetic field variation. The magnetic field variations produced by movement of the rotor 203 can modulate the current on the winding 222. In some instances, the current modulation on the winding 222 can generate a modulated current signal that is observable at the terminal ends (e.g., leads) of the winding 222. For example, if the opposite ends of the winding 222 are connected to the conductors 108a, 108b shown in FIG. 1, the controller 116 can detect the modulated current signal produced by movement of the rotor 203.

The frequency of the modulated current signal on the example winding 222 may be determined by the rotational speed of the external system that drives the rotor 203, and possibly other factors. For example, the modulated current signal frequency can be proportional to the rotational speed of the external system. The rotor 203 can have a large number of rotor teeth to produce a high-frequency signal, where the frequency of the signal is proportional to the product of the number of teeth times the velocity of the rotor shaft. In the example shown in FIG. 2, the modulated current signal has a frequency that is approximately forty-eight (48) times the rotational speed of the rotor 203 because there are forty-eight (48) equally-spaced rotor teeth 218 on the circumference of the rotor 203. The rotational speed of the rotor 203 can be the same as, or otherwise proportional to the rotational speed of the external system. For example, a gear assembly or other coupling system may convert (increase or decrease) the rotational speed between the external system and the rotor 203.

In one aspect of operation, the two terminal ends of the example winding 222 are driven with a constant AC voltage from an external voltage source. The carrier voltage signal can have a frequency (e.g., 30 kHz) that is large compared to the rotational frequency of the rotor 203. In some instances, the excitation frequency is several times (e.g., ten times) greater than the expected frequency of the tooth-to-tooth transitions at the full rated velocity of the electric machine 200. Such high frequency excitation can, in some implementations, produce sufficient raw data to be processed. As the rotor 203 is driven by the external system (e.g., the aircraft wheel), the rotor 203 moves with respect to the stator 201, and the magnetic interactions between the rotor core 206 and the stator core 204 produce magnetic field variations that modulate the current on the winding 222. Consequently, a modulated current signal is rendered on the external leads coupled at the terminal ends of the winding 222. The modulated current signal has a frequency that is proportional to (e.g., forty-eight times, or another number of times) the rotational speed of the rotor 203. The modulated current signal can be isolated from the carrier voltage signal, and the frequency of the modulated current signal can be used as an input to calculate the rotational frequency of the external system (i.e., the system that is coupled to the shaft 208 and drives the rotor 203).

Figure 3A:
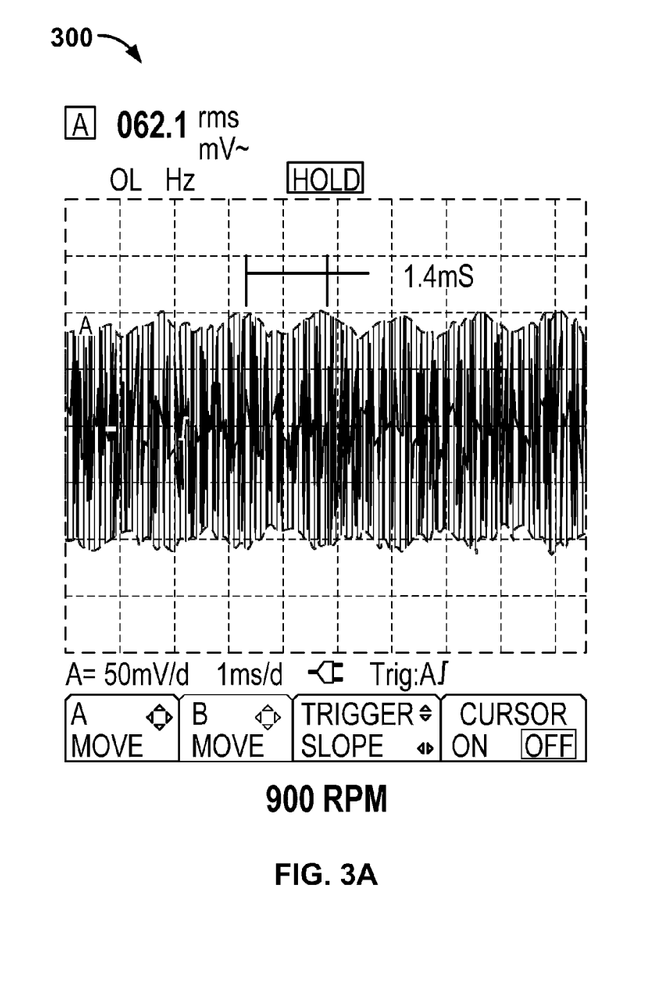
FIG. 3A is an oscillograph showing an example signal on a pair of conductors in a sensor system.
Figure 3B:
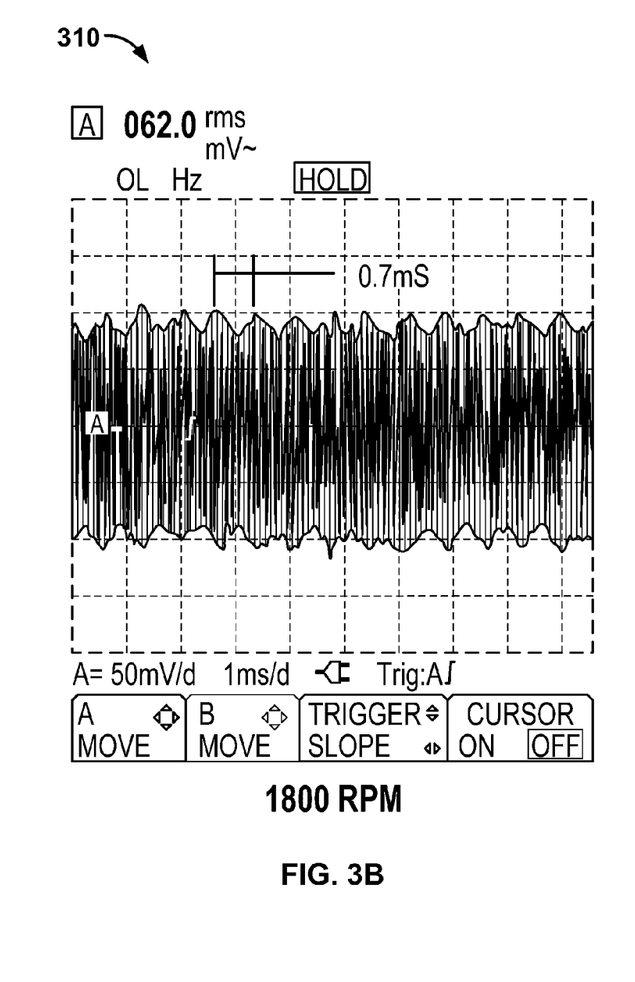
FIG. 3B is an oscillograph showing another example signal on a pair of conductors in a sensor system at twice the nominal velocity of the example shown in FIG. 3A.

FIGS. 3A and 3B are oscillographs showing example signals on a pair of conductors in a sensor system. The example oscillographs 300, 310 were produced by placing a current sensor in series with a stator winding, like the example winding 222 shown in FIG. 2. FIG. 3A is an oscillograph 300 showing the voltage on the leads of a stator winding that is coupled to a 48-tooth rotor moving at 90° rotations per minute (rpm). FIG. 3B is another oscillograph 310 showing the voltage on the leads of the same stator winding coupled to the same 48-tooth rotor moving twice as fast, at 1800 rpm.

The example signals in the oscillographs 300, 310 show voltage (vertical axis) plotted against time (horizontal axis) over a time period of about 9 milliseconds. The root mean square (rms) voltage shown in each plot is about 62 millivolts (mV). Each plot includes a high-frequency signal that corresponds to the carrier voltage signal and a lower-frequency signal that corresponds to the modulated current signal. As shown in FIGS. 3A and 3B, over wide variations in speed, the fundamental working amplitudes do not change. In the examples shown, only the tooth-related frequency that has been modulated onto the carrier signal varies.

The frequency of the carrier voltage signal in the examples is the same in FIGS. 3A and 3B, but the frequency of the modulated current signal is different, due to the differing rotor speeds. FIG. 3A shows that the period of the modulated signal is 1.4 milliseconds (ms), which corresponds to the rotor moving at a rotational speed of 900 rpm (1 rotation/0.0014 seconds/48 teeth*60 seconds per minute). FIG. 3B shows that the period of the modulated signal is 0.7 ms, which corresponds to the rotor moving at a rotational speed of 1800 rpm (1 rotation/0.0007 seconds/48 teeth*60 seconds per minute).

Figure 4:
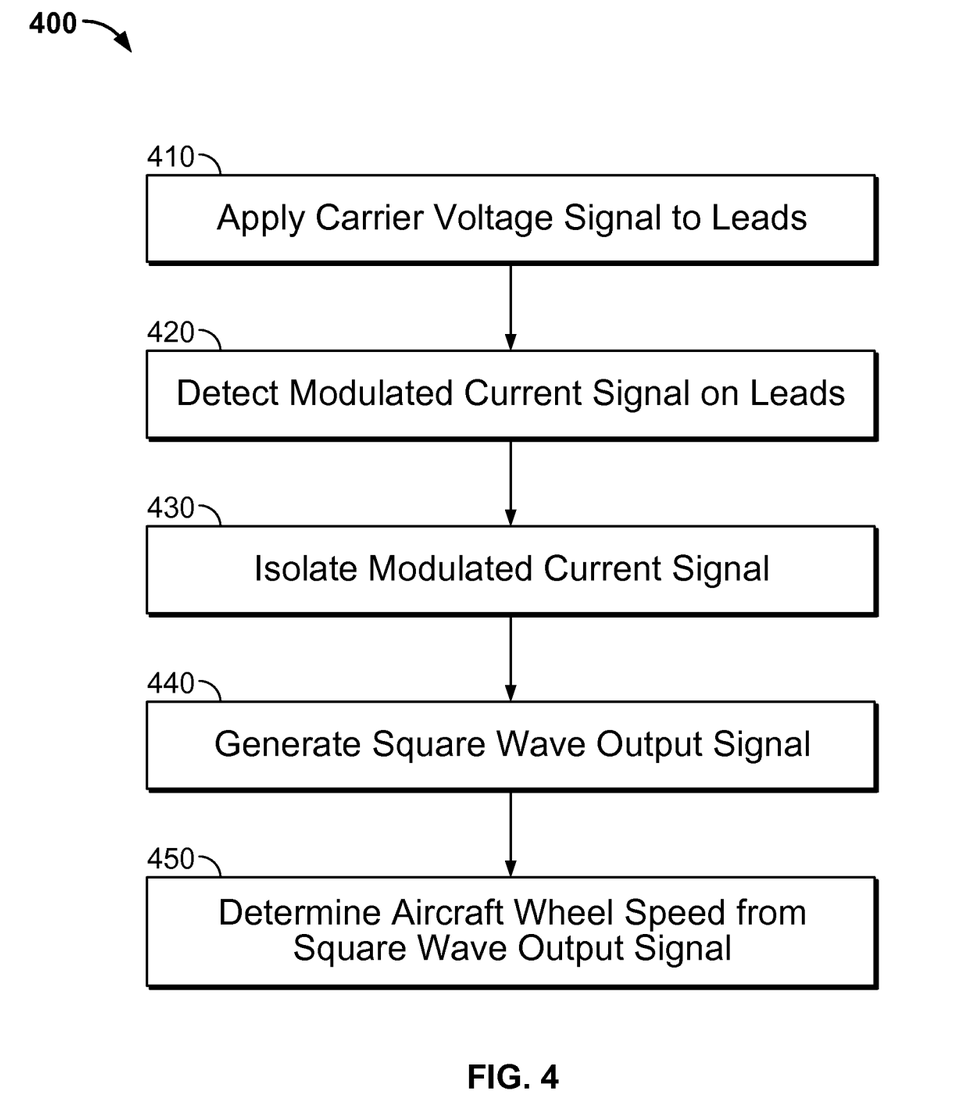
FIG. 4 is a flow chart showing an example technique for detecting aircraft wheel speed.

FIG. 4 is a flow chart showing an example process 400 for detecting aircraft wheel speed. The example process 400 can be performed by a wheel speed detection system, such as, for example, the example wheel speed detection system 100 shown in FIG. 1. The example process 400 can be modified for use in other types of systems. For example, the process 400 can be used to detect the speed or position of an aircraft wheel, an automotive wheel, a turbine rotor, an electric motor, or other rotating members.

At 410 of example process 400, a carrier voltage signal is applied to a pair of leads. For example, a single-frequency alternating voltage signal can be applied to the leads. The carrier voltage signal can be a radio frequency signal, or other frequency ranges can be used. In some cases, the carrier voltage signal has a frequency that is greater than an expected frequency of the modulated current signal. For example, the carrier voltage signal can be an order of magnitude greater than (e.g., ten or more times) the maximum expected frequency of the modulated current signal.

The leads of the example wheel speed detection system 100 can be a pair of conductors coupled to a stator winding. The stator winding can be a conductor that is installed in a stator of an electric machine. In some cases, the stator winding includes multiple conductive coils connected in series and disposed about a rotor of the electric machine. The rotor can be configured to move upon rotation of an aircraft wheel, and the stator winding can be magnetically coupled to the rotor. For example, the stator winding can be inductively coupled to the rotor, and configured to apply a modulated current signal to the leads in response movement of the rotor.

The modulated current signal of the example wheel speed detection system 100 can have a frequency that is dependent on a rotational speed of the aircraft wheel (and possibly other factors). For example, the modulated current signal can have a frequency that is the product of the aircraft wheel speed frequency and a mechanical factor. The mechanical factor can be related to the number of teeth and slots on the rotor, the speed ratio between the aircraft wheel and the rotor, and other properties of the system.

At 420 of example process 400, a modulated current signal is detected on the leads. The modulated current signal can be a variable-frequency current signal. The frequency of the modulated current signal can vary instantaneously with the rotational speed of the rotor. In some cases, the frequency of the modulated current signal is an order of magnitude (or less) than the frequency of the carrier voltage signal. In some cases, because the current signal is a modulated signal, the signal is stable against temperature variations. For example, the frequency of the modulated current signal can be temperature-independent or temperature-invariant over a full range of operating conditions. The modulated current signal can be detected by isolating the modulated current signal or in another manner.

At 430 of the example process 400, the modulated current signal is isolated from the carrier voltage signal. For example, precision rectification, low pass filtering, AC coupling and other standard processing techniques can be used to electrically isolate the modulated current signal from the carrier voltage signal. The isolated signal can have the same frequency as the modulated current signal.

At 440 of the example process 400, a square wave output signal is generated. For example, a ground-referenced comparator can be used to produce a logic-level variable-frequency square wave signal from the isolated signal. The square wave output signal can be a binary signal that has the same frequency as the modulated current signal.

At 450 of the example process 400, the aircraft wheel speed is determined from the square wave output signal. For example, the aircraft wheel speed can be determined from the frequency of the square wave output signal. In some cases, mechanical factors or electrical factors (or both) are considered in calculating the aircraft wheel speed. For example, the number of teeth and slots on the rotor, the speed ratio between the aircraft wheel and the rotor, transient properties of electrical components, and other properties of the system may be accounted for in determining the aircraft wheel speed from the square wave output signal.

In some cases, a full operational range of aircraft wheel speeds can be detected. For example, the square waveform can be stable over the full range of wheel operating speeds, which may include zero-velocity, near-zero-velocity, and higher non-zero velocities. In some implementations, the modulated signal has a voltage amplitude that remains constant (or substantially constant) as the rotational velocity of the aircraft wheel decreases and approaches zero. For example, the output signal produced by the stator winding can have a peak-to-peak voltage amplitude that varies insubstantially (e.g., within an expected range of variation due to noise, temperature, and other environmental factors) over a full range of operating speeds, even speeds approaching zero.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented separately or in any suitable subcombination.

A number of examples have been shown and described. Nevertheless, it will be understood that various modifications can be made. Accordingly, other embodiments are within the scope of the following claims.

The invention claimed is:

1. A method of sensing aircraft wheel speed, the method comprising:
    receiving a carrier voltage signal at a stator winding via a pair of conductors coupled to the stator winding, the carrier voltage signal comprising a steady state alternating voltage signal, the stator winding disposed in a stator that defines an inner circumference about a rotor that moves within the stator upon rotation of an aircraft wheel, the stator comprising major stator teeth, minor stator teeth extending toward the rotor from the major stator teeth, and minor stator slots between adjacent pairs of the minor stator teeth, each minor stator tooth being narrower than its two neighboring minor stator slots, and the rotor comprising rotor teeth extending toward the minor stator teeth and rotor slots between adjacent pairs of the rotor teeth, each rotor tooth being narrower than its two neighboring rotor slots;
    rendering a modulated current signal on the pair of conductors in response to movement of the rotor, the modulated current signal comprising a variable-frequency-modulation to the carrier voltage signal and having a frequency that is dependent on a rotational speed of the aircraft wheel;
    detecting the modulated current signal;
    generating a square wave logic signal having the frequency of the modulated current signal; and
    providing the square wave logic signal to an aircraft control system.

2. The method of claim 1, comprising isolating the modulated current signal from the carrier voltage signal.

3. The method of claim 1, wherein the carrier voltage signal is a single-frequency voltage signal.

4. The method of claim 1, wherein the frequency of the modulated current signal is temperature independent.

5. The method of claim 1, comprising determining a speed of the aircraft wheel based on the detected modulated current signal.

6. The method of claim 1, wherein the frequency of the carrier voltage signal is greater than the frequency of the modulated current signal.

7. The method of claim 1, wherein the steady state alternating voltage signal has a constant amplitude.

8. An aircraft wheel speed sensor system comprising:
    a pair of conductors coupled between an electro-mechanical system and a control system;
    the control system configured to apply a carrier voltage signal comprising a steady state alternating voltage signal to the electro-mechanical system via the pair of conductors and to detect a modulated current signal from the electro-mechanical system on the pair of conductors, the modulated current signal comprising a variable-frequency-modulation to the carrier voltage signal; and
    the electro-mechanical system including:
        a rotor that moves within an inner circumference of a stator upon rotation of an aircraft wheel; and
        the stator that includes a winding disposed about the rotor, the winding configured to render the modulated current signal by modulating current on the pair of conductors in response to movement of the rotor, the modulated current signal having a frequency that is dependent on a rotational speed of the aircraft wheel;
    wherein the stator comprises major stator teeth, minor stator teeth extending toward the rotor from the major stator teeth, and minor stator slots between adjacent pairs of the minor stator teeth, each minor stator tooth being narrower than its two neighboring minor stator slots; and
    wherein the rotor comprises rotor teeth extending toward the minor stator teeth and rotor slots between adjacent pairs of the rotor teeth, each rotor tooth being narrower than its two neighboring rotor slots.

9. The aircraft wheel speed sensor system of claim 8, the winding including a plurality of coils wound in series about the major stator teeth.

10. The aircraft wheel speed sensor system of claim 8, wherein magnetic interactions between the minor stator teeth and the rotor teeth produce the modulated current signal on the winding.

11. The aircraft wheel speed sensor system of claim 8, the rotor comprising a shaft that is mechanically coupled to the aircraft wheel.

12. The aircraft wheel speed sensor system of claim 8, wherein the electro-mechanical system does not include permanent magnets.

13. The aircraft wheel speed sensor system of claim 8, wherein electrical coupling between the electro-mechanical system and the control system is provided by only the pair of conductors.

14. The aircraft wheel speed system of claim 8, wherein the frequency of the carrier voltage signal is greater than the frequency of the modulated current signal.

15. The aircraft wheel speed system of claim 8, wherein the steady state alternating voltage signal has a constant amplitude.

16. A method of sensing aircraft wheel speed, the method comprising:
  receiving a carrier voltage signal at a stator winding disposed in a stator that defines an inner circumference about a rotor that moves within the stator upon rotation of an aircraft wheel, the carrier voltage signal being received from at most one pair of conductors external to the stator and comprising a steady state alternating voltage signal;
  rendering a modulated current signal on the at most one pair of conductors in response to movement of the rotor, the modulated current signal having a frequency that is dependent on a rotational speed of the aircraft wheel and comprising a variable-frequency-modulation to the carrier voltage signal; and
  isolating the modulated current signal from the carrier voltage signal.

17. The method of claim 16, wherein the carrier voltage signal is a single-frequency voltage signal, the frequency of the carrier voltage signal being greater than the frequency of the modulated current signal.

18. The method of claim 16, wherein the maximum voltage amplitude of the modulated current signal is constant for a range of aircraft wheel rotational speeds.

19. The method of claim 16, wherein the frequency of the carrier voltage signal is greater than the frequency of the modulated current signal.

20. The method of claim 16, wherein the steady state alternating voltage signal has a constant amplitude.

21. An aircraft wheel speed sensor system comprising:
  an electro-mechanical system electrically coupled to a control system by at most one pair of conductors, the electro-mechanical system including a stator without permanent magnets and a rotor without permanent magnets, the rotor being configured to rotate within an inner circumference of the stator, the stator configured to receive a carrier voltage signal from the control system via the at most one pair of conductors, the stator including a winding configured to render a modulated current signal on the at most one pair of conductors, wherein the modulated current signal comprises a variable-frequency-modulation to the carrier voltage signal, the modulated current signal having:
    a frequency that varies based on a rotational velocity of an aircraft wheel;
    a peak amplitude that remains constant as the rotational velocity approaches zero; and
    a constant maximum voltage amplitude for a range of aircraft wheel rotational speeds; and
  the control system configured to detect the signal on the at most one pair of conductors.

\* \* \* \* \*